Feb. 11, 1947.  H. W. INGLE  2,415,693
GAUGE FOR THE RIM OR FINISH PORTIONS OF JARS OR THE LIKE
Filed May 18, 1945
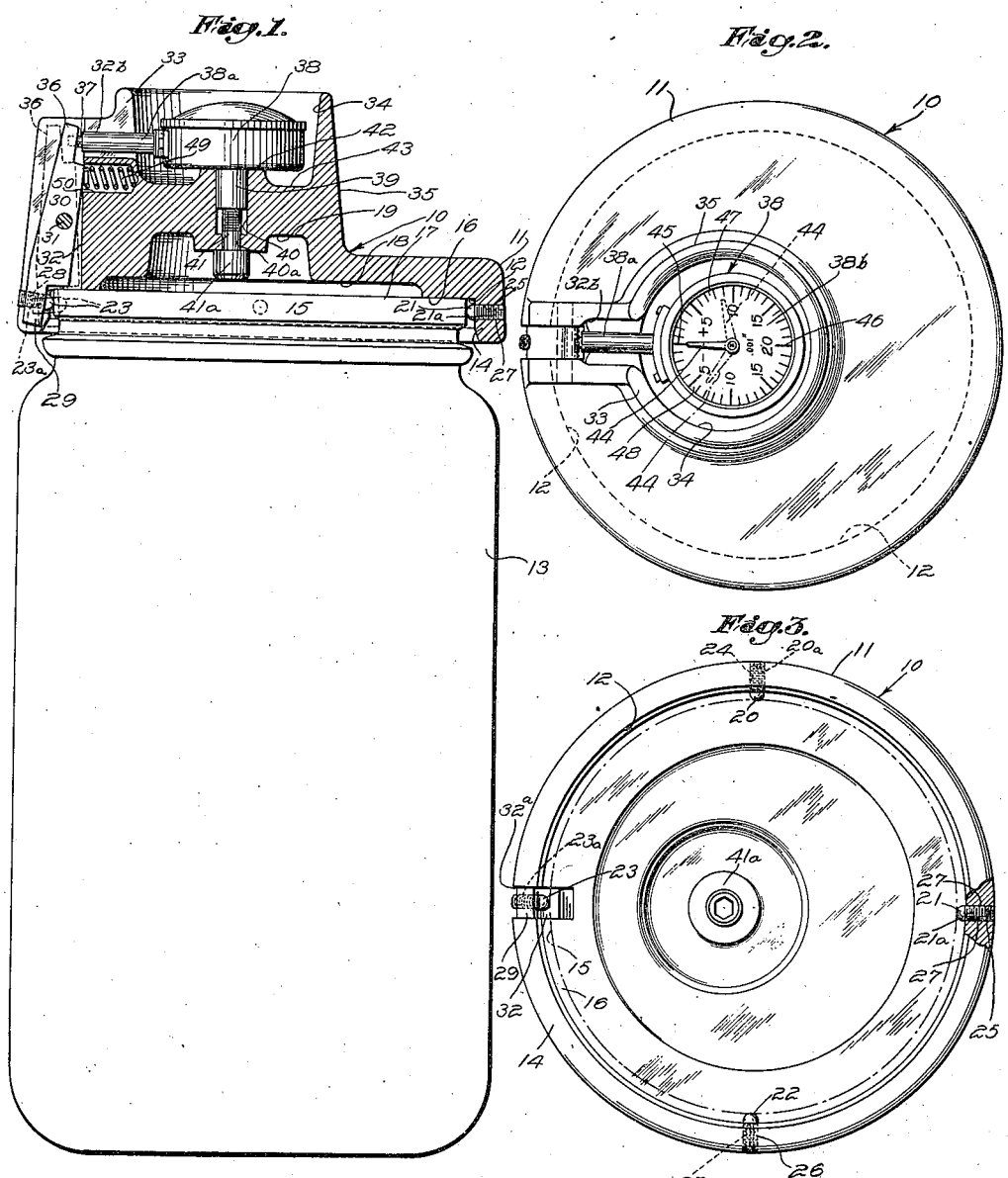
Inventor
Henry W. Ingle
by Loyd G. Bates
Attorney Patented Feb. 11, 1947

2,415,693

UNITED STATES PATENT OFFICE 2,415,693

GAUGE FOR THE RIM OR FINISH PORTIONS OF JARS OR THE LIKE

Henry W. Ingle, Windsor, Conn., assignor to Hartford-Empire Company, Hartford, Conn., a corporation of Delaware Application May 18, 1945, Serial No. 594,517

4 Claims. (Cl. 33—178)

This invention relates generally to improvements in gauges for the rim or finish portions of jars or the like and more particularly to a gauge for the outer peripheral sealing surfaces of glass jars or other containers which are to be hermetically sealed by the application thereto of sealing gaskets and closure caps, the gaskets being compressed against their sealing surfaces by the applied caps.

Glass jars or other containers of the character described should have external sealing surfaces which will meet rigid specifications as to their size, shape, regularity of surface, etc. Otherwise, they cannot be satisfactorily capped and sealed or, if the departures of their sealing surfaces from the specified requirements are excessive, capped and sealed at all. Thus, the sealing surface of a jar or other container may have a diameter greater than the maximum permissible diameter or less than the minimum permissible diameter and thus be unsuitable for its intended use. Even if such a sealing surface has a diameter within allowable maximum and minimum limits, it may be defective because of excessive "out-of-roundness," i. e., departure from true circularity at any level, or because a portion thereof has a flat face or bulges or has a shoulder, seam or protrusion thereon or an indentation or depression therein. These and similar defects in the sealing surfaces of glass jars or other containers would prevent the creation or maintenance of effective hermetic seals when the jars or containers were capped and sealed in any conventional manners, as by a vacuum sealing process. Obviously, the presence of any such defect, which would render a jar or other container unsuitable for its intended use, should be ascertained as early as possible after the beginning of an operating period or run of a forming machine by which such jars or containers are being made. Such defect may be caused by some mal-adjustment or misalignment of parts or other structural or operational shortcoming of the forming machine. Once the defect in the product has been ascertained the cause thereof may be readily ascertained and eliminated.

An object of the present invention is to provide a gauge which a workman in a glass container manufacturing plant or other appropriate place can use manually to determine quickly, easily and accurately whether or not the outer peripheral surface of the finish or rim portion of a glass container or the like is satisfactory for its intended use.

A further object of the invention is to provide a gauge of the character described which can be used to show whether or not all possible diameters of the sealing surface of a glass container being gauged come within a permissible range and also to what extent and in what manner, if at all, the sealing surface is irregular or "out of round" at any point or all points along its circumference.

A further object of the invention is to provide a gauge of the character described which is of compact form and construction and is not likely to be injured or put out of order if it should be accidentally dropped by a user or subjected otherwise to shocks and jars.

Other objects and advantages of the invention will hereinafter be pointed out or become apparent from the following description of structural features and a mode of use of an illustrative example of a gauge embodying such invention, as shown in the accompanying drawing, in which:

Figure 1 is a view showing the illustrative gauge in vertical section in a gauging position on a glass jar which is shown in side elevation, the view showing also, by dotted lines, a position which a pivoted indicator-actuating element of the gauge will assume when the gauge is not in use;

Fig. 2 is a top plan view of the gauge, three positions of the pivoted indicator hand or pointer and of the upper end of the aforesaid pivoted indicator actuating element of the gauge being indicated by dotted lines, full lines and dot-and-dash lines, respectively; and Fig. 3 is a bottom plan view of the gauge in gauging position on the jar, the latter being indicated diagrammatically by the dot-and-dash circle, a portion of the gauge being broken away to show the manner of attaching a gauging contact element to the gauge body.

The illustrative gauge shown in the drawing comprises a body, generally designated 10, which may be made of aluminum or any other suitable metal or material in any suitable known way. This body comprises a lower portion 11 which, in the example shown, is of circular cross sectional configuration and of relatively large diameter. The lower portion 11 of the gauge body has an open-bottomed circular chamber or cavity 12 therein, of sufficient diameter to receive the upper end portion of a glass container, such as a jar indicated at 13, Fig. 1, with an annular clearance space between the side wall 14 of the chamber 12 and the outer peripheral surface 15 of the upper end portion of the jar. The gauge body thus may be said to have a substantially cap-shaped lower portion which will fit loosely over the upper end of the jar or like article that is to be gauged.

The top wall of the chamber 12 preferably has a flat, smooth surface, as indicated at 16, Fig. 1, from its junction with the side wall 14 of the chamber for a sufficient part of its radial extent to provide a smooth bearing surface for the upper end 17 of the jar when the gauge body has been placed upon the latter, substantially as shown in Fig. 1. Inwardly of the surface 16, the top wall of the chamber 12 may be stepped upwardly or elevated, first at 18, and further at 19, Fig. 1. This is primarily to avoid use of excess material in the gauge body and to lighten it somewhat. Obviously, the particular shape of the top wall of chamber 12 may vary widely from that shown.

The gauge body 10 carries a plurality of cooperative, angularly spaced, gauging contact elements which project into the chamber 12 from the side wall 14 of the latter for purposes hereinafter to be pointed out. In the example shown, there are three fixed gauging contact elements, spaced 90° apart and designated 20, 21 and 22, respectively, Fig. 3, and a radially movable gauging contact element 23 which is located diametrically opposite the fixed contact element 21. The fixed contact elements 20, 21 and 22 have body portions 20a, 21a, and 22a, respectively, mounted in radial openings 24, 25, and 26, respectively, in the side wall 14 of the chamber 12. These body portions of the contact elements may have screw-threaded engagement with the walls of their respective radial openings, as indicated at 27 in Figs. 1 and 3, for the body of the contact element 21, so that the extent of projection of each of these contact elements in the chamber 12 may be adjusted initially for proper pre-setting of the contact elements and thereafter to compensate for wear, or for any other useful purpose.

The movable contact element 23 may individually be similar to each of the fixed contact elements 20, 21 and 22. Its body portion, 23a, may be in threaded engagement with a suitable threaded opening 28 in the lower end portion 29 of a vertically disposed lever 30. The latter is pivotally supported intermediate its ends on a horizontal pivot element 31 which extends transversely across a vertical slot 32 in the gauge body. The slot 32 extends vertically in one side of the gauge body member for the full height of the latter, having a lower portion 32a, Fig. 3, extending through the side wall of the chamber 12 and an inwardly enlarged upper portion 32b, Figs. 1 and 2, extending radially through a side wall 33 of an open-topped chamber or cavity 34 in the upper portion 35 of the gauge body 10. In the gauge shown, the upper portion 35 of the gauge body is of relatively reduced size as compared to the larger lower portion 11 of that body and is located eccentrically of the latter.

The lower end portion 29 of the lever 30, pivotally supported as above described, movably supports the movable contact element 23 in the lower chamber 12 in cooperative, opposed relation to the fixed contact element 21. The upper end portion 36 of the lever is in working relation to the outer end of a normally outwardly projected movable stem 37 of an indicator 38 which is mounted in a fixed position in the upper chamber 34. As shown, the indicator 38 has an attaching socket 39 on its bottom, depending in a suitable vertical bore or aperture 40 in the gauge body. A cap bolt 41 extends upwardly from the lower chamber 12 through a reduced lower end portion 40a of the bore 40 and is screwed into the attaching socket 39 until the head 41a of the cap bolt is tight against the top wall of the chamber 12, whereby to releasably secure the indicator 38 firmly in place on an upwardly raised or embossed central portion 42 of the bottom wall 43 of the top chamber. The indicator has a laterally extending tubular stem housing 38a extending in the portion 32b of the slot 32. The longitudinally movable indicator stem 37 projects from its housing to position to be actuated by the lever 30.

The particular indicator shown is a commercial unit which is supplied by the Federal Products Company, Providence, Rhode Island, as their "Federal Dial Indicator, Model A-6Q." It has a circular dial which faces upward when the indicator is mounted as described, this dial being designated 38b in Fig. 2. The dial has a circular series of graduations thereon for showing dimensional variations in thousandths of an inch from an index dimension which is indicated when the pivoted indicator hand or pointer, designated 44, registers with the left-hand graduation, 45, as shown in full lines in Fig. 2. The pointer is moved angularly about the dial in response to longitudinal movement of the stem 37 in the manner usual in dial indicators. The graduations which extend in a semi-circle on the upper half of the dial, Fig. 2, between the graduation 45 and a diametrically opposite graduation, 46, constitute a "plus" scale, designated 47. The corresponding graduations on the lower half of the dial constitute a "minus" scale, designated 48. These scales are appropriately marked for easy, accurate reading of dimensional variations from zero to twenty thousandths of an inch, plus or minus, according to whether the pointer 45 is swung clockwise from its full line position, as through the position indicated by the dotted lines, or counter-clockwise, as through the position indicated by dot-and-dash lines. Inward movement of the stem 37 in its housing will cause the clockwise swinging movement of the pointer and of course the pointer will swing in the opposite direction or counter-clockwise when the movement of the stem in its housing is outward.

A compression spring 49, in a pocket 50, in the gauge body, at the inner side of the slot 32, Fig. 1, constantly presses outwardly against the upper end of the pivoted lever 30 so as to tend to swing that lever to the position indicated by the dotted lines in Fig. 1. In that position, the upper end portion of the lever may be out of contact with the stem 37 and the inner end of the movable contact element 23 may be at the dotted line position of Fig. 1.

The dial indicator, per se, does not form part of the present invention but is a commercial unit of a type well known to those skilled in the art to which the present invention relates. It therefore is unnecessary further to illustrate or describe the particular indicator above referred to. Any other suitable known indicator or comparator may be used in lieu thereof.

The gauging elements may be formed of hardened steel or other wear-resistant material if the gauge body should be made of aluminum or some less resistant material. Preferably, these contact elements have rounded or hemispherical contact faces so as to have point-contact with the gauge surface of the jar or other container with a minimum of friction or scratching of that surface. For gauging different surfaces, the contact elements may have their contact faces formed appropriately for such surfaces.

It will be noted that the indicator and all movable parts of the gauge are housed by the gauge body so as to be protected against shocks and jars. The gauge is not likely to be injured or its utility to be impaired should it be accidentally dropped from the hand of the user onto a factory floor or knocked about while it is lying upon a bench or other supporting surface.

The illustrative gauge shown in the drawing and hereinbefore described may be used substantially as follows: The pre-setting of the contact elements may be accomplished as follows. A circular master gauge disc having a diameter the same as the maximum permissible diameter of the surface 15 of the glass jar may be used in the presetting of the contact elements. The surface 15 is the sealing surface of the jar, against which a gasket is to be pressed by its cap when the jar is capped and sealed. Such a master gauge disc, which is not shown as it is well known in the art, may be placed in the chamber 12 of the gauge body when the latter is being supported or held in an inverted position. The contact elements may then be adjusted until they respectively contact with the peripheral surface of the master gauge disc at points spaced 90° apart, the disc then being centered in the chamber 12. The distance between the contact faces of the fixed contact elements 20 and 22 then will be equal to the maximum allowable diameter of the sealing surface 15 on the upper portion of the jar. The distance between the fixed contact element 21 and the movable contact element 23 will of course be the same and at this time the upper end portion of the lever 30 will have pushed the stem 37 of the indicator inwardly sufficiently to cause the hand 44 of the indicator to be positioned at the graduation of the plus scale which indicates fifteen-thousandths of an inch. This is to give effect to a standard specification in which the working range of diameters of sealing surfaces of jars like the example shown is between a maximum of fifteen-thousandths of an inch above a mean or preferred diameter and fifteen-thousandths below that average or preferred diameter. On the indicator shown, the pointer 44 will be positioned at the graduation 45, Fig. 2, when the distance between the movable contact element 23 and its opposed fixed contact element 21 is equal to the standard mean or preferred diameter above referred to.

Having pre-set the contact elements in the manner described, the gauge may then be placed over the upper end portion of the jar substantially as shown in Fig. 1, with the jar resting upon any suitable flat surface (not shown) and the gauge being held steady by one hand of the operator. The operator then may turn or rotate the jar about its vertical axis by the fingers of his other hand while he holds the gauge against rotation and while the upper end portion of the jar is kept approximately centered in the chamber 12 and against the contact face of the fixed contact element 21. As the jar is turned or rotated about its vertical axis relative to the gauge, variations from the standard mean or preferred diameter will be shown by the indicator, the pointer moving clockwise whenever the diameter exceeds the standard mean dimension and counter-clockwise when the diameter falls below the standard mean or preferred dimension. Should the portion of the jar provided with the sealing surface have a diameter above the permissible maximum diameter, that fact will be instantly shown by cramping or binding of the jar top between the opposed fixed contact elements 20 and 22 and the jar then may be immediately rejected without further gauging. Of course, the extent of the departure, either in an upward or downward direction from the standard mean or preferred dimension, may be shown up to twenty-thousandths of an inch by the particular dial indicator of the gauge shown in the drawing.

It will be understood that the finish or rim portions of practically all jars, or like containers, are more or less "out-of-round." If the "out-of-roundness" is not excessive and if the change of contour is gradual and regular, the departure from the ideal condition will not preclude satisfactory capping and sealing of the jar. However, even if the departure should not be in excess of that which is allowable under the standard specifications, a jar may be unsuitable for capping and sealing if its sealing surface is "out-of-round" in an objectionable manner, as by having an abrupt shoulder, seam or protrusion thereon, by having a portion which bulges outwardly or by having indentations or depressions therein. These faults may be caused by mis-alignment or mal-adjustment of parts of the glassware forming machine or by some defect in a glassware forming mold, or other forming machine defect. When the gauge of the present invention is used, the presence of any such defect in the sealing surface on a jar is at once indicated so that it can be traced immediately to its cause and the cause eliminated. Thus, use of the gauge to gauge a jar or similar container at the beginning of a period of production of such jars by a forming machine will enable an operator to correct or cure any faults in the forming machine which, if unnoticed and uncorrected, would occasion loss of a considerable part of the production of the machine. The gauge, therefore, is advantageously usable as a production control instrument. It may also be used for occasional or "spot" gauging of jars or similar containers by the inspection department of a glassware manufacturing plant or at any other time or place at which ascertainment of the condition of the rim or finish portion of a jar or other container is of interest or importance.

Obviously, many changes in and modifications of the illustrative gauge shown in the accompanying drawing and hereinbefore described will now be obvious to those skilled in the art and I therefore do not wish to be restricted to the details of such gauge.

I claim:

1. A gauge comprising a body having a substantially cap-shaped lower portion adapted to fit loosely over the upper end portion of a glass jar or like article, said gauge body having a vertical slot therein at one side thereof, the lower portion of said slot extending through the wall of said cap-shaped lower portion of the gauge body, a vertical lever pivoted in said slot for limited swinging movements about a horizontal axis, a gauging contact element carried by the lower portion of said lever in position to project inwardly therefrom into the cap-shaped lower portion of said gauge body, a second gauging contact element carried by the lower portion of the gauge body in a fixed position at the side of the latter opposite the first contact element, whereby said two contact elements will contact with an outer peripheral surface on the upper end portion of the article within the lower portion of the gauge body at diametrically opposite points on said peripheral surface and will gauge all diameters of said peripheral surface within a particular range on relative rotation between the gauge body and the article which has its upper end portion disposed between said contact elements, yieldable means disposed between said lever and the gauge body to urge the lever to swing about its pivotal axis in the direction to carry said first contact element to the limit of its inward movement in the lower portion of the gauge body, and an indicator mounted on said gauge body and having a longitudinally movable operating stem disposed in working relation to a portion of said lever so that said indicator will be operated as said lever swings about its pivotal axis in response to inward and outward movements of the first contact element, said indicator showing variations between the different diameters of said peripheral surface as measured by said contact elements during a cycle of relative rotation between the gauge body and the peripheral surface.

2. A gauge comprising a substantially flat body having oppositely facing cavities in its bottom and top portions, respectively, and having a vertical slot in one side thereof extending through the sides of both said cavities, an indicator mounted in the cavity in the top portion and having an operating stem projecting outwardly from that cavity into the upper portion of said vertical slot, a vertical intermediately pivoted lever disposed in said slot with the upper end portion of the lever in working relation to the operating stem of said indicator, a gauging contact element carried by the lower end portion of the lever to project therefrom into the cavity in the bottom portion of the gauge body, a spring disposed between a portion of the gauge body and the lever to act on the latter to urge the lower end portion of the lever inward, and a second gauging contact element carried by the gauge body to project into the cavity in the bottom of the latter at the side of said cavity opposite said first contact element.

3. A gauge comprising a substantially flat body having oppositely facing cavities in its bottom and top portions, and having a vertical slot in one side thereof extending through the sides of both said cavities, an indicator mounted in the cavity in the top portion and having an operating stem projecting outwardly from that cavity into the upper portion of said vertical slot, a vertical intermediately pivoted lever disposed in said slot with the upper end portion of the lever in working relation to the operating stem of said indicator, a gauging contact element carried by the lower end portion of the lever to project therefrom into the cavity in the bottom portion of the gauge body, a spring disposed between a portion of the gauge body and the lever to act on the latter to urge the lower end portion of the lever inward, a second gauging contact element carried by the gauge body to project into the cavity in the bottom of the latter at the side of said cavity opposite said first contact element, and a pair of additional gauging contact elements carried by the gauge body to project into the cavity in the bottom of the latter at points opposite each other and spaced approximately 90° around the cavity from each of the first two contact elements.

4. A gauge comprising a substantially flat body formed in part to define a cavity adapted for the reception of an end portion of a glass jar or like article so that sufficient clearance is provided between the wall of the cavity and said end portion of said article to permit relative rotation between said wall and said article about the axis of the latter, said gauge body being formed in another part to provide a second cavity spaced from the first cavity and being formed in still another part to provide a slot located between said cavities, said cavities being partially open at their sides next to said slot so as to communicate laterally with the latter, a lever pivoted in said slot, a gauging contact element carried by said lever in position to project from said slot into the communicating portion of said first-named cavity, a second gauging contact element carried by the gauge body to project into the first-named cavity at the side of said cavity opposite said first-named contact element, whereby said two contact elements will contact with an outer peripheral surface on said end portion of the article within the said cavity and will gauge all diameters of said peripheral surface within a particular range on relative rotation between the gauge body and the article, yieldable means disposed between said lever and the gauge body to urge the lever to swing about its pivotal axis in the direction to carry said first contact element to the limit of its movement into the said first-named cavity, and an indicator mounted in said second-named cavity and having a longitudinally movable operating stem disposed in working relation to a portion of said lever so that said indicator will be operated as said lever swings about its pivotal axis in response to inward and outward movements of said first contact element, said indicator showing variations between the different diameters of said peripheral surface as measured by said contact elements during a cycle of relative rotation between the gauge body and the peripheral surface.

HENRY W. INGLE.

REFERENCES CITED

The following references are of record in the file of this patent:

UNITED STATES PATENTS

| Number | Name | Date |
| --- | --- | --- |
| 2,338,868 | Owens | Jan. 11, 1944 |
| 2,327,629 | Fedorchak | Aug. 24, 1943 |
| 1,206,202 | Bright | Nov. 28, 1916 |
| 1,446,149 | Benoit et al | Feb. 20, 1923 |
| 1,658,994 | Lauer | Feb. 14, 1928 |